United States Patent
Tamura

(10) Patent No.: US 9,847,686 B2
(45) Date of Patent: Dec. 19, 2017

(54) STATOR FOR ROTATING ELECTRIC MACHINE

(71) Applicant: DENSO CORPORATION, Kariya, Aichi-pref. (JP)

(72) Inventor: Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 637 days.

(21) Appl. No.: 14/490,029

(22) Filed: Sep. 18, 2014

(65) Prior Publication Data
US 2015/0076953 A1    Mar. 19, 2015

(30) Foreign Application Priority Data

Sep. 18, 2013 (JP) .................. 2013-192933
Jul. 31, 2014 (JP) .................. 2014-156229

(51) Int. Cl.
*H02K 3/28* (2006.01)
*H02K 3/12* (2006.01)

(52) U.S. Cl.
CPC .......... *H02K 3/28* (2013.01); *H02K 3/12* (2013.01)

(58) Field of Classification Search
CPC ........................................... H02K 3/28
USPC ................................. 310/184, 207
See application file for complete search history.

(56) References Cited

U.S. PATENT DOCUMENTS

| | | | | |
|---|---|---|---|---|
| 5,691,590 A * | 11/1997 | Kawai | ............ | H02K 3/18 310/180 |
| 6,455,974 B1 * | 9/2002 | Fogarty | ............ | H02K 3/28 310/184 |
| 6,979,926 B2 * | 12/2005 | Ogawa | ............ | H02K 3/12 310/179 |
| 2008/0079328 A1 | 4/2008 | Shichijo et al. | | |
| 2010/0141078 A1 | 6/2010 | Kouda et al. | | |
| 2011/0043069 A1 | 2/2011 | Tanaka et al. | | |

(Continued)

FOREIGN PATENT DOCUMENTS

| | | |
|---|---|---|
| JP | 2005-110361 | 4/2005 |
| JP | 2008-113539 | 5/2008 |

(Continued)

OTHER PUBLICATIONS

English Machine Translation, JP 2013-081351, May 2013.*

(Continued)

*Primary Examiner* — Burton Mullins
(74) *Attorney, Agent, or Firm* — Nixon & Vanderhye P.C.

(57) ABSTRACT

A stator core with a plurality of slots circumferentially arranged therearound has a stator winding including three (UVW) phase windings, each phase winding having 4n parallel windings. The stator winding is formed of U-shaped conductor segments inserted in the slots from one axial end, a pair of open end portions of each conductor segment extending axially from of the stator core and being bent toward circumferentially opposite directions, the bent portions being star connected together. The plurality of slots have, for each phase winding, pairs of circumferentially adjacent slots, each slot having an even number of slot-received portions of the phase winding radially aligned in a column, and for each circumferential slot pairs, the slot-received portion in an m-th layer of each slot of the pair is electrically connected to the portion inserted in an (m+1)-th layer of a slot of a circumferentially adjacent slot.

4 Claims, 13 Drawing Sheets

(56) References Cited

U.S. PATENT DOCUMENTS

| | | |
|---|---|---|
| 2012/0007462 A1 | 1/2012 | Kouda et al. |
| 2012/0248924 A1 | 10/2012 | Tanaka et al. |
| 2013/0076188 A1 | 3/2013 | Ikeda et al. |
| 2014/0125187 A1 | 5/2014 | Suzuki et al. |

FOREIGN PATENT DOCUMENTS

| | | |
|---|---|---|
| JP | 2009-112186 | 5/2009 |
| JP | 2010-142019 | 6/2010 |
| JP | 2011-045193 | 3/2011 |
| JP | 2013-81351 | 5/2013 |
| JP | 2014-096857 | 5/2014 |

OTHER PUBLICATIONS

Office Action (3 pgs.) dated Sep. 3, 2015 issued in corresponding Japanese Application No. 2014-156229 with an at least partial English language translation (3 pgs.).

\* cited by examiner

FIG.9A NORMAL SECTION

FIG.9B SWITCHING SECTION

PARALLEL WINDINGS U1–U4

ROTOR ECCENTRICITY

ONLY SLOTS B RECEIVE SLOT-RECEIVED PORTIONS ON LEFT HALF

SWITCHING SECTION

ONLY SLOTS A RECEIVE SLOT-RECEIVED PORTIONS ON RIGHT HALF

STATOR FOR ROTATING ELECTRIC MACHINE

CROSS-REFERENCE TO RELATED APPLICATION

This application is based on and claims the benefit of priority from earlier Japanese Patent Applications No. 2013-192933 filed Sep. 18, 2013 and No. 2014-156229 filed Jul. 31, 2014, the descriptions of which are incorporated herein by reference.

BACKGROUND

Technical Field

The present invention relates to a stator for a rotating electric machine mounted in a vehicle or the like and used as an electrical motor or a generator.

Related Art

A rotating electric machine to be mounted in a vehicle is generally known that includes a rotor, a stator core including a plurality of slots radially opposing the rotor and arranged in a circumferential direction of the core, and a stator having a stator winding formed of a plurality of phase windings wound through the slots of the stator core.

Japanese Patent Application Laid-Open Publication No. 2005-110361 discloses techniques for an armature (or the stator) for the rotating electric machine that can provide larger currents and simplify lead outs and connecting lines. Japanese Patent Application Laid-Open Publication No. 2005-110361 discloses a stator winding formed of three phase windings (U-, V-, and W-phase windings) lap wound around the stator core by welding or bonding given pairs of open end portions of a plurality of conductor segments inserted in the slots of the stator core on one axial coil end. Each phase winding of the stator core is formed of a parallel connection of four parallel windings. Japanese Patent Application Laid-Open Publication No. 2005-110361 further discloses that an X-phase winding is evenly wound in each pair of circumferentially adjacent X-phase slots (for X=U, V, W).

Japanese Patent Application Laid-Open Publication No. 2014-96857 discloses techniques for a stator having multiple double slots, i.e. a plurality pairs of circumferentially adjacent pairs of slots in a distributed winding structure, capable of preventing circulating current from occurring between parallel windings. Japanese Patent Application Laid-Open Publication No. 2014-96857 discloses a stator winding formed of multiple phase windings wave wound around the stator core, each phase winding of the stator winding is a parallel connection of a plurality of parallel windings of the same phase. Japanese Patent Application Laid-Open Publication No. 2014-96857 further discloses a technique of switching between the first and second slots belonging to different pairs upon transition from one layer to another layer.

The stator winding disclosed in Japanese Patent Application Laid-Open Publication No. 2005-110361 is configured such that given open end portions of the plurality of U-shaped conductor segments are welded to each other. Each slot therefore receives an even number of slot-received portions of conductor segments radially aligned in a column. The plurality of U-shaped conductor segments include outer and inner conductor segments. The outer conductor segments are inserted in the first and fourth layers of the slots, and the inner conductor segments are inserted in the second and third layers of the slots.

The outer and Inner conductor segments are normally arranged at six slot intervals (or at a six slot pitch), where, as shown in FIG. 17, each outer conductor segment 72 straddles one of the Inner conductor segments 71, which leads to overlap of conductor segments.

Five slot pitch based switching and seven slot pitch based switching are provided so that the phase winding can switch between the first and second slot groups, which, however, may give rise to a disadvantage that an outer conductor segment 72A inserted in the first and fourth layers of the slots that are five slots away from each other straddles the normal inner conductor segment 71 inserted in the second and third layers of the slots that are six slots away from each other. Further, as shown in FIG. 18, an outer conductor segment 72B inserted in the first and fourth layers of the slots that are seven slots away from each other may further straddle the outer conductor segment 72A. Such triple overlap may increase an axial length of the coil end portion of the stator winding.

It can be envisaged that when slot-received portions of six conductor segments are inserted in slots radially aligned in a column, first conductor segments 75 to be inserted in the third and fourth layers of the slots, second conductor segments 76 to be inserted in second and fifth layers of the slots, and third conductor segments 77A, 77B to be inserted in first and sixth layers of the slots may be used. The third conductor segment 77A is to be inserted into the first and sixth layers of the slots that are five slots away from each other. And the third conductor segment 77B is to be inserted into the first and sixth layers of the slots that are seven slots away from each other. This may give rise to a disadvantage that the second conductor segment 76 straddles the first conductor segment 75, the conductor segment 77A straddles the second conductor segment 76, and the conductor segment 77B straddles the third conductor segment 77A, as shown in FIG. 19. Such quadruple overlap may further increase an axial length of the coil end portion of the stator winding.

In consideration of the foregoing, exemplary embodiments of the present invention are directed to providing a stator for a rotating electric machine capable of completely preventing circulating current from occurring between parallel windings of each phase winding while preventing an axial length of a coil end portion from increasing.

SUMMARY

In accordance with an exemplary embodiment of the present invention, there is provided a stator for a rotating electric machine, where the stator includes: a stator core having a plurality of slots circumferentially arranged around the core; and a stator winding including three (U-phase, V-phase, W-phase) out-of-phase phase windings wound around the stator core, each of the phase windings being a parallel connection of 4×n (n being a positive integer) parallel windings, the stator winding being formed of a plurality of U-shaped conductor segments inserted in the slots from one axial end of the stator core, a pair of open end portions of each conductor segment extending axially outside of the stator core on the other axial end being bent toward circumferentially opposite directions, ends of given bent portions of the conductor segments are welded to each other such that the phase windings are electrically star connected to each other in a predetermined electrical connection pattern.

The plurality of slots comprise, for each of the phase windings, pairs of circumferentially adjacent slots, in each slot of which an even number of slot-received portions of the phase winding are radially aligned in a column, and for each pair of the circumferentially adjacent slots for the phase winding, the slot-received portion inserted in an m-th layer (m being a positive integer) of each slot of the pair of circumferentially adjacent slots being electrically connected to the slot-received portion inserted in an (m+1)-th layer of one of slots of an adjacent pair of circumferentially adjacent slots.

In addition, for each of the parallel windings of each of the phase windings, all the layers of the slots of the pairs of circumferentially adjacent slots receive an equal number of slot-received portions of the parallel winding.

In the stator configured as above, for each pair of the circumferentially adjacent slots for the phase winding, the slot-received portion inserted in an m-th layer (m being a positive integer) of each slot of the pair of circumferentially adjacent slots is electrically connected to the slot-received portion inserted in an (m+1)-th layer of one of slots of an adjacent pair of circumferentially adjacent slots. This can prevent axial lengths of the coil end portions from increasing.

Each of the phase windings is a parallel connection of 4×n (n being a positive integer) parallel windings. In a portion of the stator winding at an axial coil end of the stator winding opposite a portion of the stator winding formed of a plurality of bent portions, each of the parallel windings of each of the phase windings (41U, 41V, 41W) revolves circumferentially while alternating the first and second slot groups in the circumferential direction through a combination of five and seven slot pitch based switchings. This allows for striking a balance between the parallel windings, thereby completely preventing circulating current from occurring between the parallel windings.

BRIEF DESCRIPTION OF THE DRAWINGS

FIG. 9A is a schematic showing turn portions, in a normal section, of phase windings forming the stator winding of the first embodiment;

FIG. 9B is a schematic showing turn portions, in a switching section, of phase windings forming the stator winding of the first embodiment;

DESCRIPTION OF SPECIFIC EMBODIMENTS

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

First Embodiment

Figure 1:
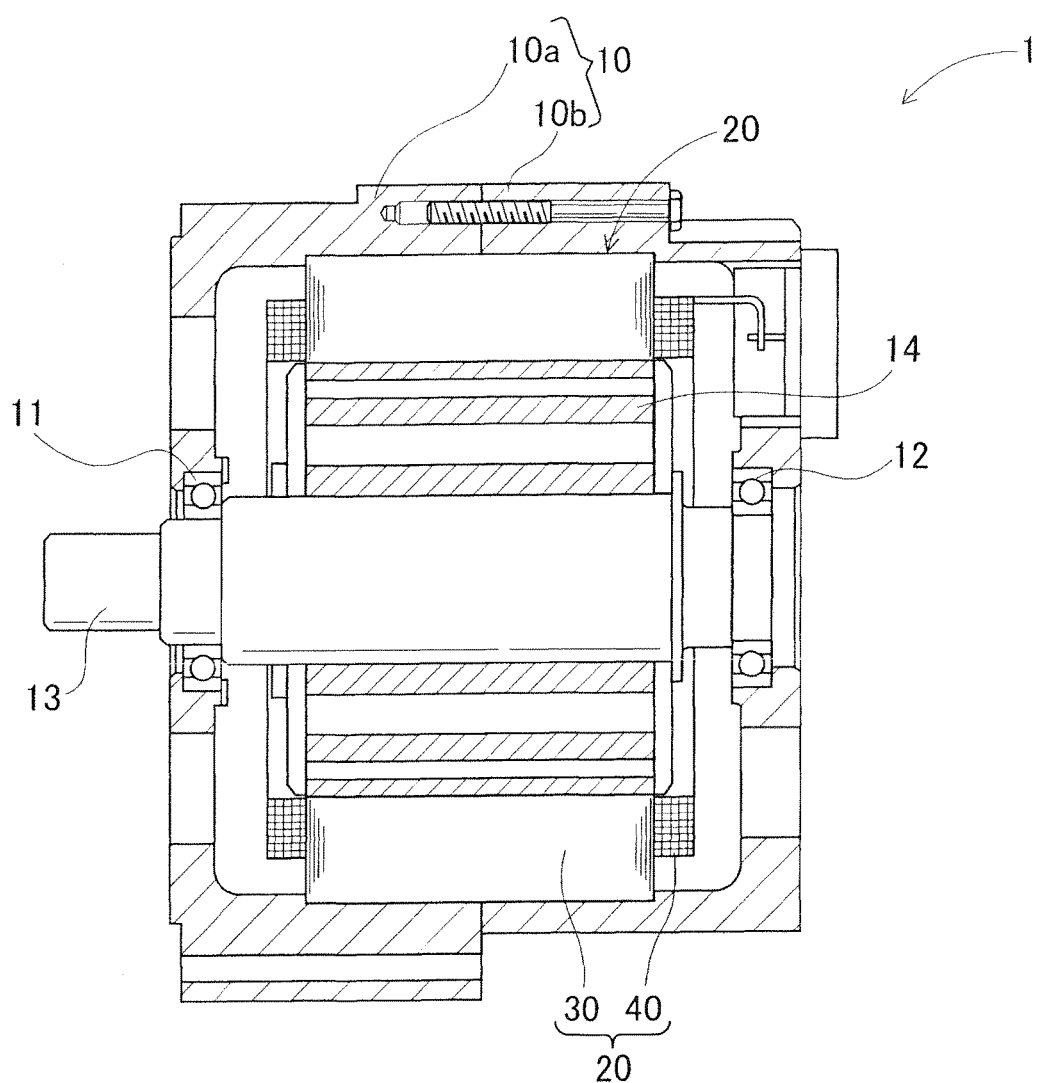
FIG. 1 is an axial cross-sectional view of a rotating electric machine including a stator in accordance with a first embodiment of the present invention.

A rotating electric machine 1 incorporating therein a stator 20 in accordance with a first embodiment of the present invention may be used as a vehicle electrical motor. As shown in FIG. 1, the rotating electric machine 1 includes a housing 10 formed by joining openings of a pair of housing members 10a and 10b both shaped like a closed-end cylinder (referring here to a cylinder closed at one end), opening to opening, a rotor 14 secured to a rotary shaft 13 rotatably supported by the housing 10 via bearings 11 and 12, and a stator 20 positioned to encompass the rotor 14 within the housing 10 and fixed to the housing 10.

The rotor 14 has a plurality of poles that are arranged around the outer circumference of the rotator 14 opposite the inner circumference of the stator 20, circumferentially spaced a predetermined distance apart from each other and circumferentially alternating in polarity. The plurality of poles are formed by a plurality of permanent magnets embedded at predetermined locations around the outer circumference of the rotor 14. The number of poles of the rotor 14 may vary with individual rotating electric machines. In the present embodiment, the number of poles is set to eight (including four north poles and four south poles).

Figure 2:
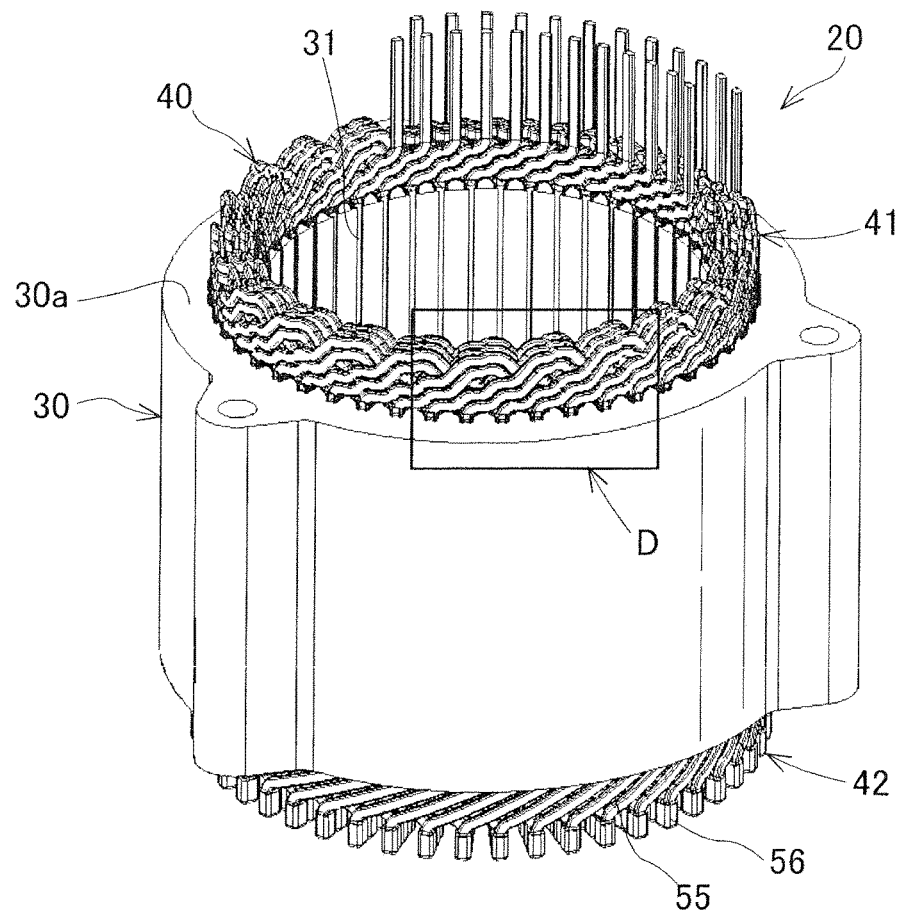
FIG. 2 is a schematic, perspective view of the stator of the first embodiment.
Figure 3:
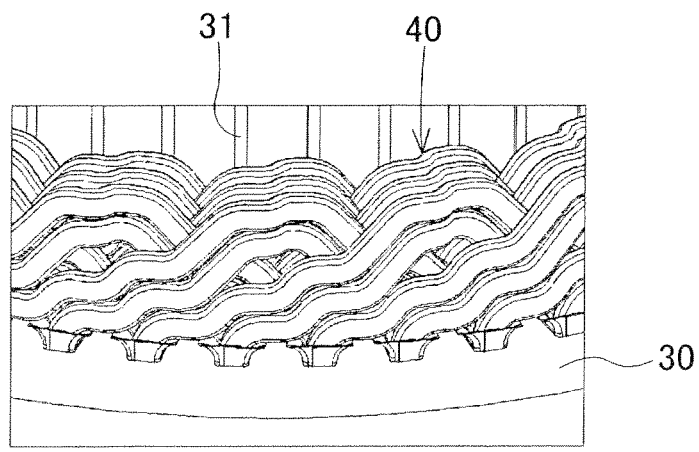
FIG. 3 is an expanded view of a portion D of the stator shown in FIG. 1.

The stator 20 will now be explained with reference to FIGS. 2-10. As shown in FIGS. 2-3, the stator 20 includes an annular stator core 30 having a plurality of slot 31 arranged in a circumferential direction of the stator core 30, and three-phase (U-phase, V-phase, W-phase) stator winding 40 wound in the slots 31 of the stator core 30.

The stator core 30 is a stack of a plurality of magnetic steel sheets stacked in the axial direction of the stator core 30 as a single monolithic piece. The stator core 30 includes an annular back core 33, and a plurality of teeth 34 radially inwardly protruding from the back core 33 and circumferentially spaced a predetermined distance apart from each other to form the plurality of slots 31, one for each pair of adjacent slots 31. The number of slots per phase and per pole of the stator winding 40 is two. Hence, the number of slots is the product of eight (the number of poles of the rotator 14), three (the number of phases) and two (the number of slots per phase and per pole). In the present embodiment, the number of slots is forty eight. The forty eight slots 31 include nine pairs of adjacent U-phase slots, nine pairs of adjacent V-phase slots and nine pairs of adjacent W-slots, where a sequence of one pair of adjacent U-phase slots, one pair of adjacent V-phase slots and one pair of adjacent W-slots appear repeatedly three times along the circumferential direction of the stator core 30.

Figure 6:
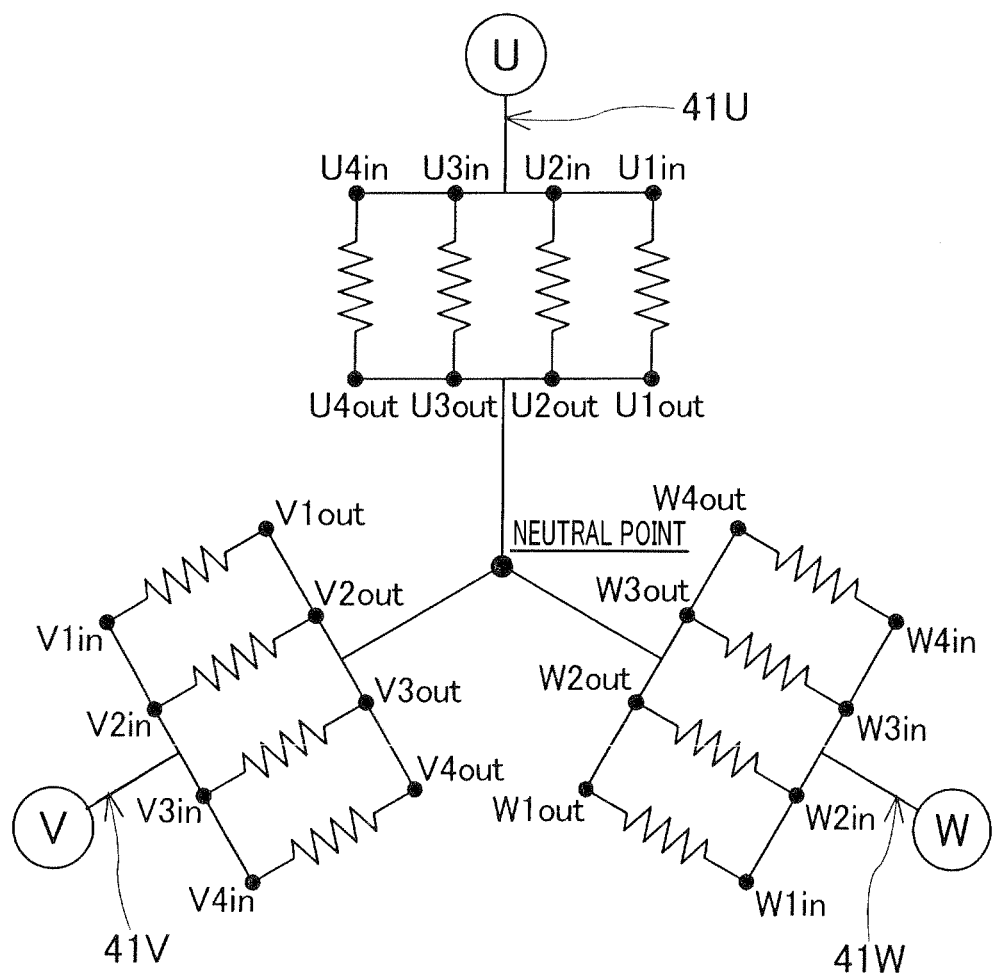
FIG. 6 is a schematic electrical circuit of a stator winding of the first embodiment.
Figure 7A:
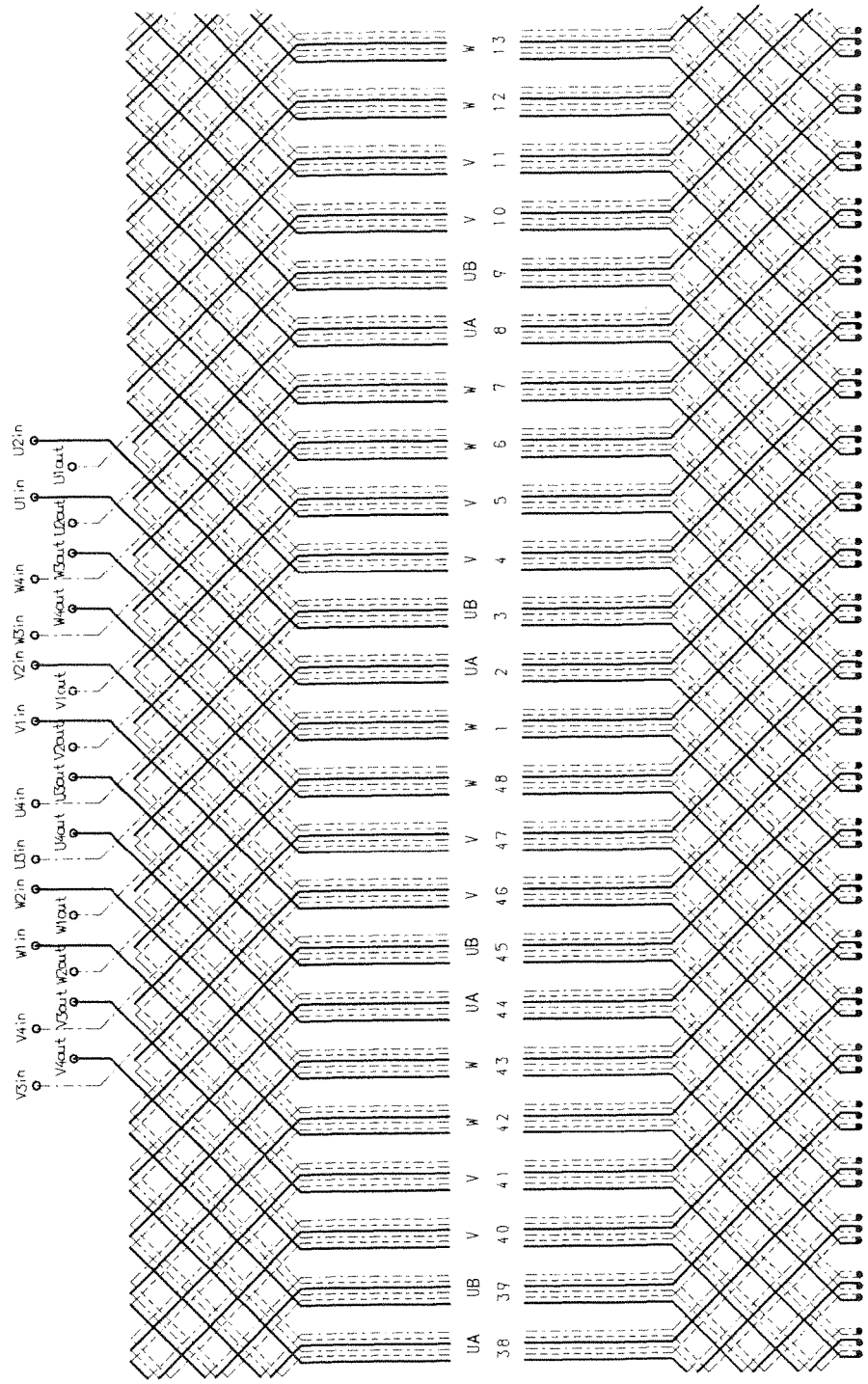
FIG. 7A is a left half of a winding specification diagram of the stator winding of the first embodiment.
Figure 7B:
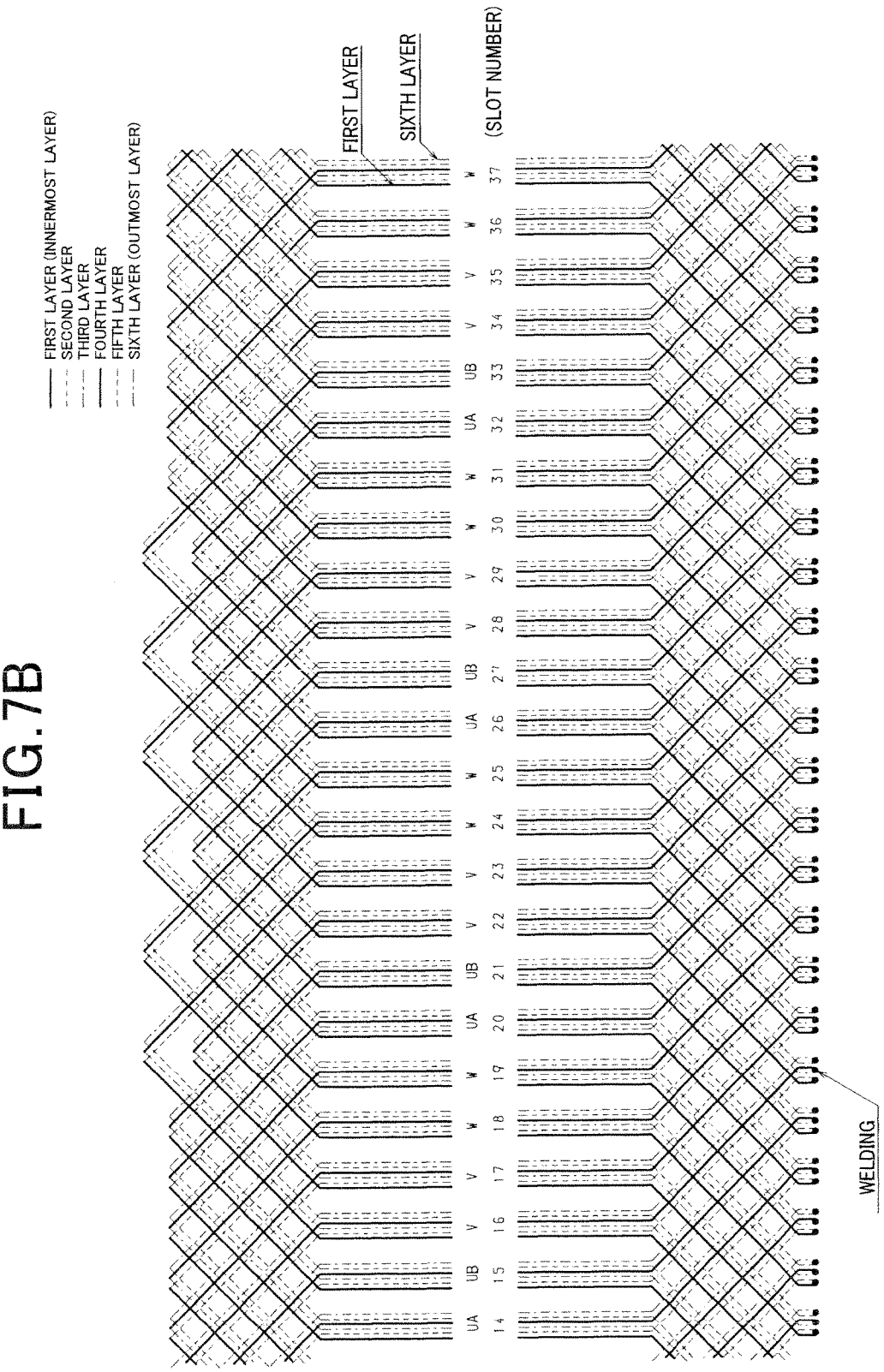
FIG. 7B is a right half of the winding specification diagram of the stator winding of the first embodiment.

In the stator winding 40, as shown in FIG. 6, one end of a U-phase winding 41U that is a parallel connection of four parallel windings U1-U4, one end of a V-phase winding 41V that is a parallel connection of four parallel windings V1-V4, and one end of a W-phase winding 41W that is a parallel connection of four parallel windings W1-W4 are electrically star connected at a neutral point. The stator winding 40 is formed of a plurality of U-shaped conductor segments 50 inserted in the slots 31 from one axial end of the stator core 30. A pair of open end portions of each conductor segment 50 extending axially outside of the stator core 30 on the other axial end are bent toward circumferentially opposite directions. Thereafter, ends of the bent portions of different conductor segments 50 are welded to each other in accordance with a predetermined connection pattern. Each conductor segment 50 is a rectangular wire folded in a U-shaped configuration, where the rectangular wire is a conductor wire that is rectangular in cross-section and has a an Insulating coating thereon.

Figure 4:
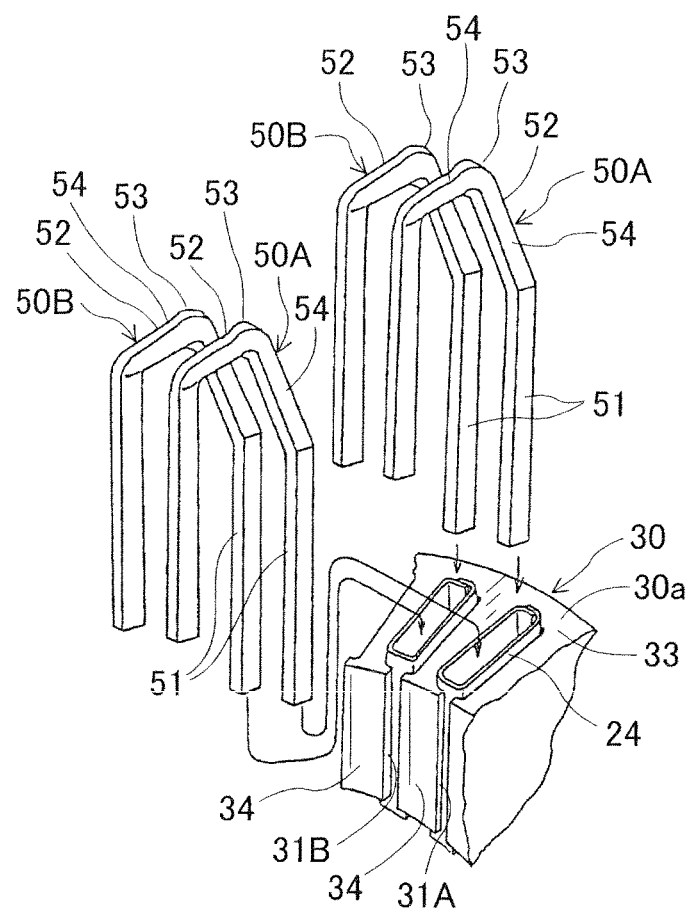
FIG. 4 is a schematic showing conductor segments to be inserted into slots of a stator core of the first embodiment.
Figure 5:
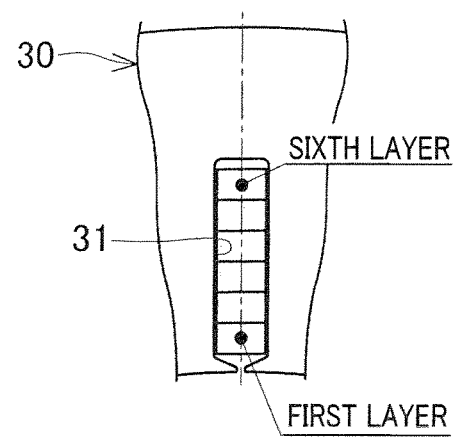
FIG. 5 is a partial cross-sectional view of the stator of the first embodiment.

As shown in FIG. 4, each U-shaped conductor segment 50 includes a pair of parallel straight portions 51 and a turn portion 52 connecting ends of the pair of straight portions 51. The turn portion 52 includes, at its center, a crown staircase portion 53 extending along an end face 30a of the stator core 30, and on both sides of the crown staircase portion 53, inclined portions 54 at a determined angle to the end face 30a of the stator core 30. An insulator 24 provides electrical isolation between the stator core 30 and the stator winding 40.

FIG. 4 shows, as an example, different sets of two conductor segments 50A, 50B to be inserted into two circumferentially adjacent slots 31A, 31B of the same phase. A pair of straight portions 51 of each set of two conductor segments 50A, 50B are to be inserted, from one axial end of the stator core 30 (e.g., from the upper side of FIG. 4), not into the same slot 31, but into the two different, circumferentially adjacent slots 31A, 31B. For example, as to the set of two conductor segments 50A, 50B on the right hand side of FIG. 4, one of the straight portions 51 of the conductor segment 50A is to be inserted into the outermost layer (the sixth layer) of the slot 31A, and the other of the straight portions 51 of the conductor segment 50A is to be inserted into the fifth layer of another slot (not shown) that is located one pole pitch (NS pole pitch) away from the slot 31A in the counterclockwise direction of the stator core 30.

One of the straight portions 51 of the other conductor segment 50B is to be inserted into the outermost layer (the sixth layer) of the slot 31B that is adjacent to the slot 31A, and the other of the straight portions 51 of the conductor segment 50B is to be inserted into the fifth layer of another slot (not shown) that is located one pole pitch (NS pole pitch) away from the slot 31B in the counterclockwise direction of the stator core 30. the two conductor segments 50A, 50B are spaced one slot pitch away from each other. More specifically, the conductor segment 50B is located one slot pitch away from the conductor segment 50A in the counterclockwise direction of the stator core 30. As such, an even number of straight portions 51 of conductor segments are to be inserted into each slot 31. In the present embodiment, total of six straight portions 51 of six conductor segments radially aligned in a column are to be inserted into each slot 31.

Open end portions of a pair of straight portions 51 of each conductor segment 50 extending axially outside of the stator core 30 on the other axial end (the lower side of FIG. 4) from the slot 31 are bent toward circumferentially opposite directions to provide bent portions 55 having a length of substantially one-half pole pitch and inclined at a determined angle to the end face 30a of the stator core 30 (see FIG. 2). Ends of the prescribed bent portions 55 of different conductor segments 50 are welded to each other in accordance with a predetermined electrical connection pattern. That is, the prescribed conductor segments 50 are electrically connected in series, where the slot-received portions (straight portions 51) in the m-th layers (m being a natural number equal to or greater than one) of the respective slot 31 and the slot-received portions in the (m+1)-th layers of the respective slots 31 are electrically connected to each other. The stator winding 40 is thereby formed of the phase windings 41U, 41V, 41W that are wave windings around the Stator core 30 through the slots 31.

The stator winding 40 includes the U-phase, V-phase, and W-phase windings, each of which is a hexa-wound cylinder coil formed of basic U-shaped conductor segments 50. The stator winding 40 further includes, for each phase, deformed conductor segments (not shown, but different in shape from the basis segments) including conductor segments connected to a lead out from an output and a lead out from a neutral point and conductor segments having turn portions that respectively provide connection between the first and second turn portions, connection between the second and third turn portions, . . . , and connection between the fifth and sixth turn portions. Such deformed conductor segments allow a winding end of the phase winding 41U, a winding end of the phase winding 41V, and a winding end of the phase winding 41W to be star connected as shown in FIG. 6.

The stator winding 40 wound around the stator core 30 as above includes a first ring-shaped coil end portion 41 formed of the plurality of turn portions protruding to the exterior of the slots 31 from one axial end face of the stator core 30 (see FIG. 2), and a second ring-shaped coil end portion 42 formed of the plurality of bent-portions 55 and end joints 56 protruding to the exterior of the slots 31 from the other axial end face of the stator core 30 (see FIG. 2).

Winding specifications for the stator winding 40 will now be explained with reference FIG. 7A, FIG. 7B, and FIGS. 8 to 10. However, for the sake of simplicity, since the specifications for the three phase windings 41U, 41V, 41W forming the stator winding 40 are similar except in electrical phase, it is sufficient to describe only the winding specification for the U-phase winding 41U.

Figure 8:
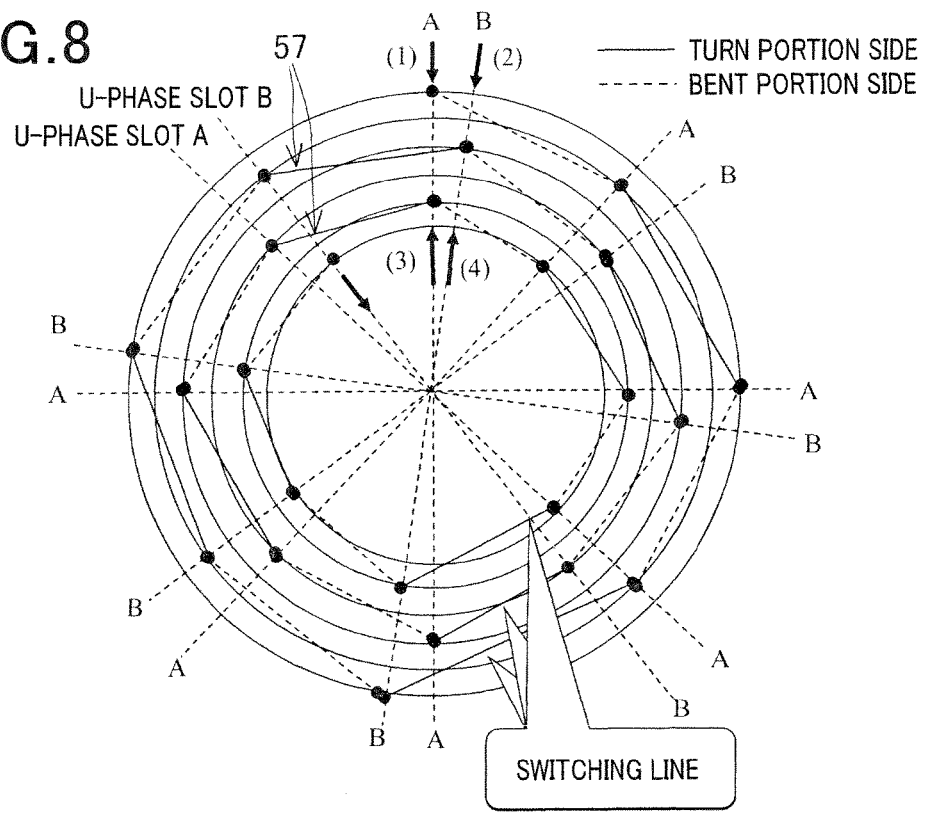
FIG. 8 is a schematic showing positions and a trajectory of slot-received portions of one of parallel windings (U3) of the stator winding of the first embodiment.

Referring to FIG. 8, pairs of circumferentially adjacent U-phase slots A, B (hereinafter also referred to as first and second U-phase slots) are disposed at six slot intervals. The upper pair of circumferentially adjacent U-phase slots A, B shown in FIG. 8 respectively correspond to the second slot (UA) and the third slot (UB) shown in FIG. 7A. Each of the first and second U-phase slots A, B receives an even number of slot-received (straight) portions of the U-phase winding 41U radially aligned in a column (see FIG. 5). The solid lines A-A each connecting two first U-phase slots A, A, the solid lines A-B each connecting two U-phase slots (one first U-phase slot and one second U-phase slot) A, B, and the solid lines each connecting two second U-phase slots B, B represent the turn-portion side of the conductor segments. The dashed lines A-A each connecting two first U-phase slots A, A, the dashed lines A-B each connecting two U-phase slots (one first U-phase slot and one second U-phase slot) A, B, and the dashed lines each connecting two second U-phase slots B, B represent the bent-portion-side (welding-side) portions of the conductor segments.

Figure 10:
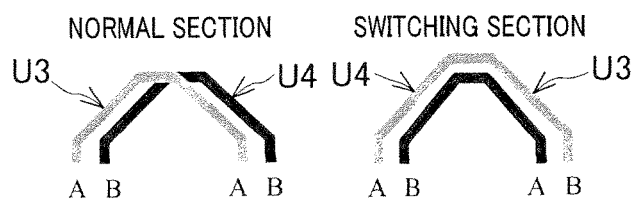
FIG. 10 is a schematic showing a number of phase windings received in each layer of each of a pair of circumferentially adjacent X-phase slots (X=U, V, W) of the first embodiment.

In FIG. 8, the parallel winding U3 of the U-phase winding 41U is shown originating from the sixth layer (the outermost layer) of the second slot (UA) and revolving inwardly from the position (1) of the sixth layer of the second slot (UA) in the clockwise direction through the fifth layer of the eighth slot (UA), the sixth layer of the fourteenth slot (UA), the fifth layer of the twentieth slot (UA), the sixth layer of the twenty-seventh slot (UB), the fifth layer of the thirty-third slot (UB), the sixth layer of the thirty-ninth slot (UB), the fifth layer of the forty-fifth slot (UB) in this order, thereby providing the first revolution. When going from the fifth layer of the twentieth slot (UA) to the sixth layer of the twenty-seventh slot (UB), the parallel winding U3 switches from one of the first U-phase slots A to one of the second U-phase slots B that is circumferentially seven slots away from the one of the first U-phase slots A. This allows, as shown in FIG. 10, the sixth and fifth layers of each of the first and second U-phase slots A, B to evenly receive two slot-received portions of the parallel winding U3.

Subsequently, the parallel winding U3 transitions from the fifth layer of the forty-fifth slot (UB) to the fourth layer of the third slot (UB) that is circumferentially six slots away from the forty-fifth slot (UB) via a transition line 57 to begin the second revolution. The transition line 57 provides transition between the E-th layer and the (E+1)-th layer (E being a positive even number). In the present embodiment, for E=2, the transition line 57 provides transition between the second layer (the fifth layer), from the winding starting side (the outer circumference side), and the third (the fourth layer) layer.

In the second revolution, as shown in FIG. 8, the parallel winding U3 of the U-phase winding 41U further revolves inwardly in the clockwise direction through the third layer of the ninth slot (UB), the fourth layer of the fifteenth slot (UB), the third layer of the twenty-first slot (UB), the fourth layer of the twenty sixth slot (UA), the third layer of the thirty-second slot (UA), the fourth layer of the thirty-eighth slot (UA), the third layer of the forty-forth slot (UA) in this order. When going from the third layer of the twenty-first slot (UB) to the fourth layer of the twenty-sixth slot (UA), the parallel winding U3 switches from one of the second U-phase slots 8 to one of the first U-phase slots A that is circumferentially five slots away from the one of the second U-phase slots B. This allows, as shown in FIG. 10, the fourth and third layers of each of the first and second U-phase slots A, B to evenly receive two slot-received portions of the parallel winding U3.

Subsequently, the parallel winding U3 transitions from the third layer of the forty-fourth slot (UA) to the second layer of the second slot (UB) that is circumferentially six slots away from the forty-fourth slot (UA) via the transition line 57 to begin the third revolution. The transition line 57 provides transition between the E-th layer and the (E+1)-th layer (E being a positive even number). In the present embodiment, for E=4, the transition line 57 provides transition between the fourth layer (the third layer), from the winding starting side (the outer circumference side), and the fifth (the second layer) layer.

In the third revolution, as shown in FIG. 8, the parallel winding U3 of the U-phase winding 41U further revolves inwardly in the clockwise direction through the first layer (the innermost layer) of the third slot (UA), the second layer of the fourteenth slot (UA), the first layer of the twentieth slot (UA), the second layer the twenty-seventh slot (UB), the first layer of the thirty-third slot (UB), the second layer of the thirty-ninth slot (UB), the first layer of the forty-fifth slot (UB) at which the parallel winding U3 of the U-phase winding 41U terminates, in this order. When going from the first layer of the twentieth slot (UA) to the second layer of the twenty-seventh slot (UB), the parallel winding U3 switches from one of the first U-phase slots A to one of the second U-phase slots B that is circumferentially seven slots away from one of the first U-phase slots A. This allows, as shown in FIG. 10, the first and second layers of each of the first and second U-phase slots A, B to evenly receive two slot-received portions of the parallel winding U3.

All of the transition lines 57 for the parallel winding U3 have a six slot pitch and located within a given circumferential section (between the forty-fourth slot and the third slot for instance) of the first coil end portion 41 of the stator winding 40. In addition, a winding starting end (the second slot) and a winding terminating end (the forty-fifth slot) are located within the given circumferential section for the transition lines 57.

The parallel winding U4 of the U-phase winding 41U originates from the sixth layer (the outermost layer) of the third slot (UB) and revolves inwardly from the position (2) of the sixth layer of the third slot (UB) as shown in FIG. 8 in the clockwise direction until the first to third revolutions are completed. When going from the twenty-first slot (UB) to the twenty-sixth slot (UA) and when going from the twentieth slot (UA) to the twenty-seventh slot (UA), the parallel winding U3 switches between one of the first U-phase slots A and one of the second U-phase slots B. This allows, as shown in FIG. 10, the first to sixth layers of each of the first and second U-phase slots A, B to evenly receive two slot-received portions of the parallel winding U4.

The parallel winding U1 of the U-phase winding 41U originates from the first layer (the innermost layer) of the second slot (UA) and revolves outwardly from the position (3) of the first layer of the second slot (UA) as shown in FIG. 8 in the counterclockwise direction until the first to third revolutions are completed. Similarly, when going from the thirty-second slot (UA) to the twenty-seventh slot (UB) and when going from the thirty-third slot (UB) to the twenty-sixth slot (UA), the parallel winding U1 switches between one of the first U-phase slots A and one of the second U-phase slots B. This allows, as shown in FIG. 10, the first to sixth layers of each of the first and second U-phase slots A, B to evenly receive two slot-received portions of the parallel winding U1.

The parallel winding U2 of the U-phase winding 41U originates from the first layer (the innermost layer) of the third slot (UB) and revolves outwardly from the position (4) of the first layer of the third slot (UB) as shown in FIG. 8 in the counterclockwise direction until the first to third revolutions are completed. Similarly, when going from the thirty-third slot (UB) to the twenty-sixth slot (UA) and when going from the thirty-second slot (UA) to the twenty-seventh slot (UB), the parallel winding U2 switches between one of the first U-phase slots A and one of the second U-phase slots B. This allows, as shown in FIG. 10, the first to sixth layers of each of the first and second U-phase slots A, B to evenly receive two slot-received portions of the parallel winding U2.

This allows, for each of the parallel windings U1-U4, the first to sixth layers of each of the first and second U-phase slots A, B to evenly receive two slot-received portions of the parallel winding.

In the switching section for the parallel windings U3, U4 (i.e., between the twentieth slot (UA) and the twenty-seventh slot (UB)), the parallel winding U3 that switches between two slots that are seventh away from each other straddles the parallel winding U4 that switches between two slots that are fifth away from each other, as shown in FIG. 9B. In the sections other than the switching section (that is, the normal sections), the parallel winding U3 and the parallel winding U4 cross each other between the sixth layer and the fifth layer, between the fourth layer and the third layer, and between the second layer and the first layer, as shown in FIG. 9A.

The parallel windings V1-V4 of the V-phase winding 41V and the parallel windings W1-W4 of the W-phase winding 41W, being similar to the parallel windings U1-U4 of the U-phase winding 41U set forth above, are not repeated.

In the stator 20 of the present embodiment configured as above, for each of phase windings 41U, 41V, 41W, the slot-received portion inserted in the m-th layer and the slot-received portion inserted in the (m+1)-th layer for each slot are electrically connected to each other according to a wave winding specification. This can prevent axial lengths of the first and second coil end portions 41, 42 from increasing.

Particularly, in the present embodiment, the first coil end portion 41 of the stator winding 40 formed of a plurality of turn portions 52 includes only turn portions 52 that each straddle up to another turn portion 52. For example, in the switching section for the parallel windings U1-U4, V1-V4, and W1-W4, the parallel winding that switches between two slots A, B that are seven slots away from each other can straddle another parallel winding that switches between two slots A, B that are five slots away from each other, as shown in FIG. 9B. This can prevent the increase in axial length of the first coil end portion.

For each of the parallel windings U1-U4, V1-V4, and W1-W4, all the layers (the first to sixth layers) of the first and second U-phase slots A, B that are circumferentially adjacent each other evenly receive a uniform number of slot-received portions of the parallel winding. This allows for striking a balance between the parallel windings U1-U4, V1-V4, and W1-W4, thereby completely preventing circulating current from occurring between the parallel windings U1-U4, V1-V4, and W1-W4.

All of the transition lines 57 for each of the parallel windings U1-U4, V1-V4, and W1-W4 have a six slot pitch and located within a given circumferential section of the first coil end portion 41 of the stator winding 40. In addition, the winding starting end and the winding terminating end are located within the given circumferential section for the transition lines 57. This can reduce an axial length of the first coil end portion of the connection part. This can also reduce an axial length of the deformed conductor segments for the winding starting end and the winding terminating end, which allows for reducing an axial length of the connection part.

The stator core 30 has a plurality of slots 31 formed of a circumferential repetition of a sequence of a pair of adjacent U-phase slots, a pair of adjacent V-phase slots, and a pair of adjacent W-slots in this order. For each of the phase windings 41U, 41V, and 41W, six conductor segments radially aligned in a column are to be inserted into six layers of each slot 31. The U-phase winding 41U is a parallel connection of four parallel windings U1-U4, the V-phase winding 41V is a parallel connection of four parallel windings V1-V4, and the W-phase winding 41W is a parallel connection of four parallel windings W1-W4. This can provide the stator winding 40 having three-turn characteristics as intermediate characteristics between four-turn and two-turn characteristics.

The number of turns refers to a number of parallel windings per pole, which is derived from the following equation: (number of turns)=(slot multiple)×(number of windings in slot)/(number of parallel windings). In the present embodiment, the slot multiple is 2, the number of windings in slot is 6, and the number of parallel windings is 4. The number of turns is therefore 2×6/4=3.

Figure 11:
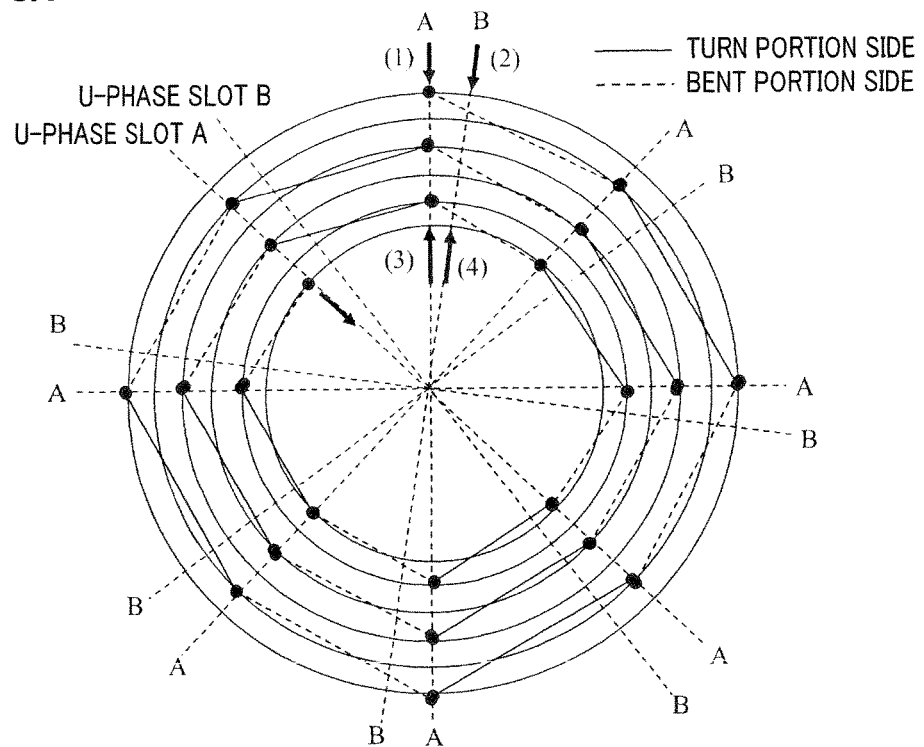
FIG. 11 is a schematic showing positions and a trajectory of slot-received portions of one of parallel windings (U3) of the stator winding of a comparative example.

FIG. 11 shows an exemplary comparative case.

The parallel winding U3 of the U-phase winding 41U originates from the sixth layer (the outermost layer) of the second slot (UA) and revolves inwardly from the position (1) of the sixth layer of the second slot (UA) in the clockwise direction with a six-slot pitch through the fifth layer of the eighth slot (UA), the sixth layer of the fourteenth slot (UA), the fifth layer of the twentieth slot (UA), the sixth layer of the twenty-sixth slot (UA), the fifth layer of the thirty-second slot (UA), the sixth layer of the thirty-eighth slot (UA), the fifth layer of the forty-fourth slot (UA) in this order, which provides the first revolution. Subsequently, the parallel winding U3 transitions from the fifth layer of the forty-fourth slot (UA) to the fourth layer of the second slot (UA) that is circumferentially sixth adjacent to the forty-fourth slot (UA) to begin the second revolution. The parallel winding U3 of the U-phase winding 41U continues to revolve inwardly in the clockwise direction with a six-slot pitch until the third revolution is completed. It can be seen from FIG. 11 that only the first to sixth layers of the first U-phase slots A respectively receive four slot-received portions of the parallel winding U3 while the first to sixth layers of the second U-phase slots B respectively receive no slot-received portions of the parallel winding U3.

Figure 12:
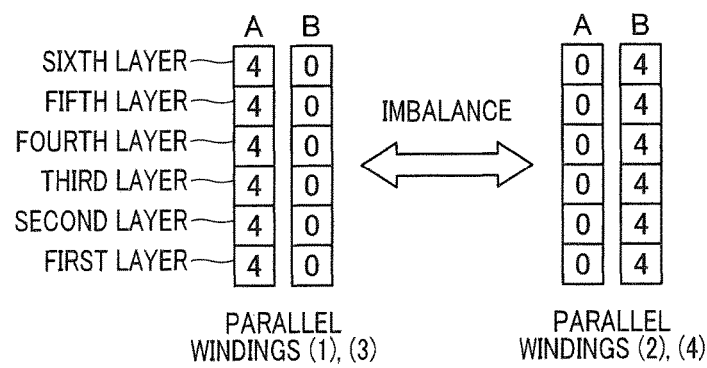
FIG. 12 is a schematic showing a number of phase windings received in each layer of each of a pair of circumferentially adjacent X-phase slots (X=U, V, W) of a comparative example.
Figure 13A:
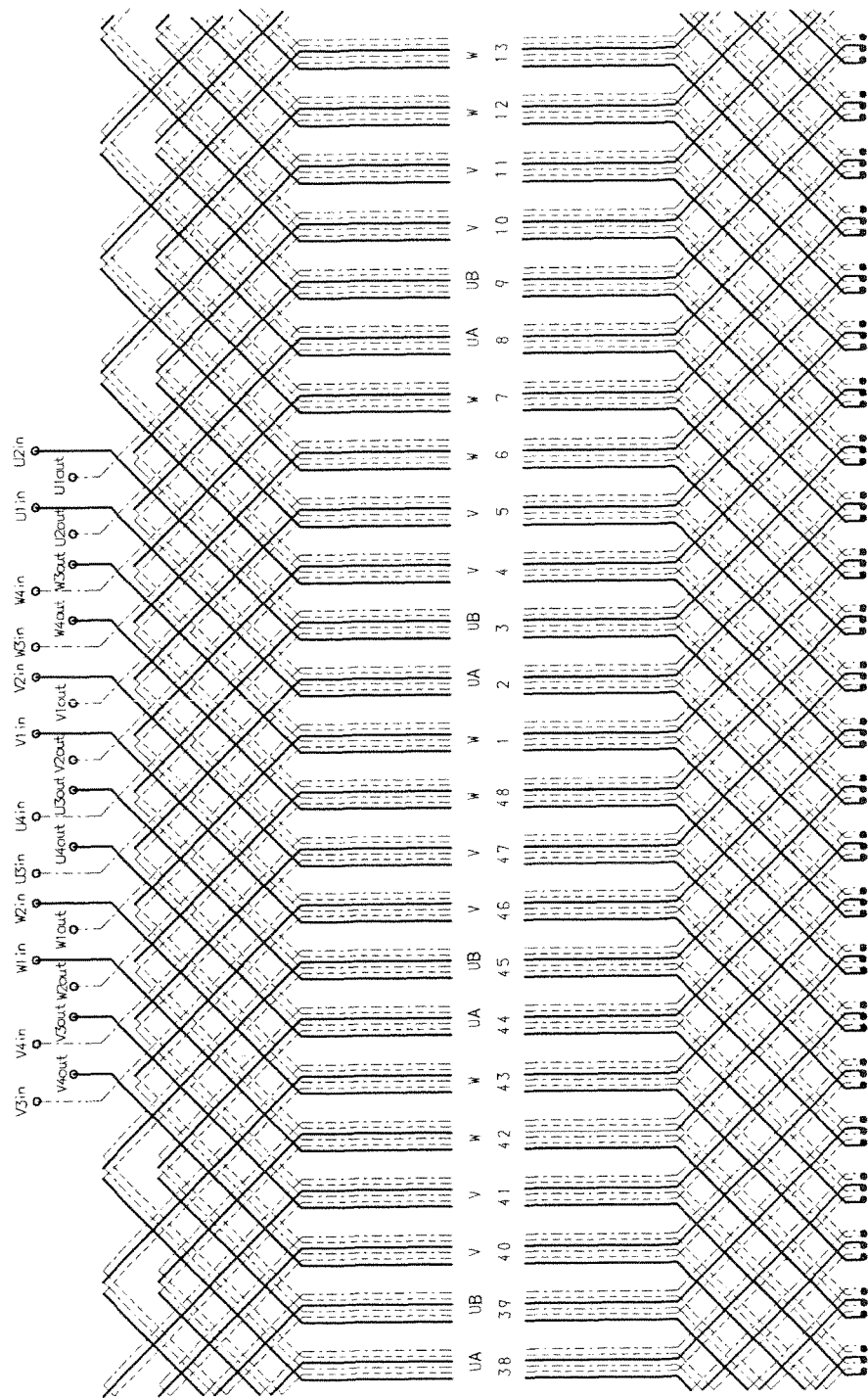
FIG. 13A is a left half of a winding specification diagram of a stator winding of a second embodiment.
Figure 13B:
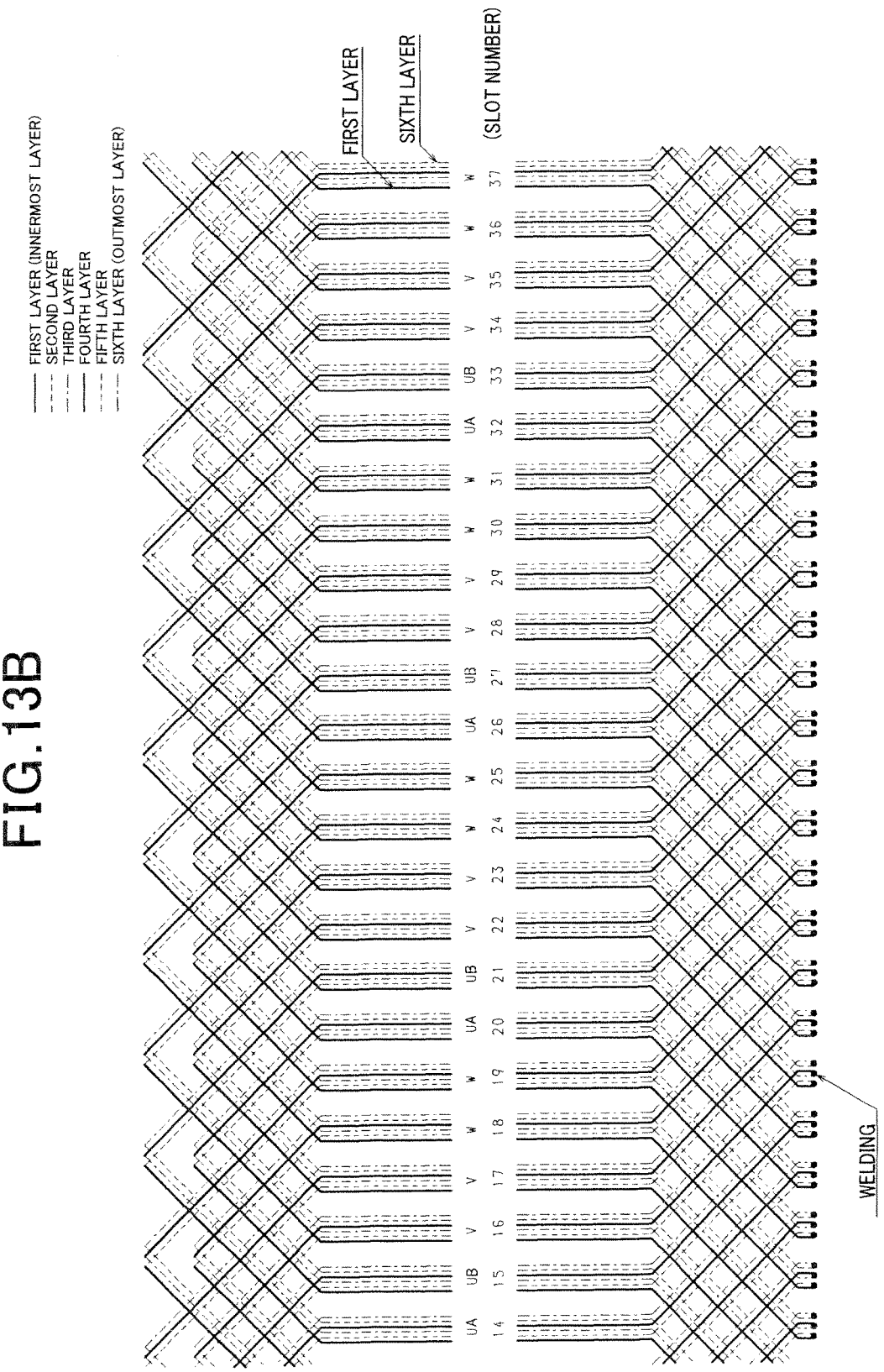
FIG. 13B is a right half of the winding specification diagram of the stator winding of the second embodiment.

The parallel winding U1 of the U-phase winding 41U originates from the first layer (the innermost layer) of the second slot (UA) and revolves outwardly from the position (3) of the first layer of the second slot (UA) as shown in FIG. 11 in the counterclockwise direction with a six-slot pitch until the first to third revolutions are completed. Also in the case of the parallel winding U1 of the U-phase winding 41U, only the first and sixth layers of the first U-phase slots A respectively receive four slot-received portions of the parallel winding U1 as shown in FIG. 12 while the first and sixth layers of the second U-phase slots B respectively receive no slot-received portions of the parallel winding U1.

The parallel winding U4 of the U-phase winding 41U originates from the sixth layer (the outermost layer) of the third slot (UB) and revolves inwardly from the position (2)

of the sixth layer of the third slot (UB) as shown in FIG. 11 in the clockwise direction with a six-slot pitch until the first to third revolutions are completed. In the case of the parallel winding U4 of the U-phase winding 41U, only the first and sixth layers of the second U-phase slots B respectively receive four slot-received portions of the parallel winding U4 as shown in FIG. 12 while the first and sixth layers of the first U-phase slots A respectively receive no slot-received portions of the parallel winding U4.

The parallel winding U2 of the U-phase winding 41U originates from the first layer (the innermost layer) of the third slot (UB) and revolves outwardly from the position (4) of the first layer of the third slot (UB) as shown in FIG. 11 in the counterclockwise direction with a six-slot pitch until the first to third revolutions are completed. Also in the case of the parallel winding U2 of the U-phase winding 41U, only the first and sixth layers of the second U-phase slots B respectively receive four slot-received portions of the parallel winding U2 as shown in FIG. 12 while the first and sixth layers of the first U-phase slots A respectively receive no slot-received portions of the parallel winding U2.

The similar applies for the parallel windings V1-V4 of the V-phase winding 41V and the parallel windings W1-W4 of the W-phase winding 41W.

In this comparative case 1, the parallel windings U1-U4, V1-V4, and W1-W4 are out of balance between the first and second U-phase slots A, B. This configuration cannot prevent the circulating current from occurring between the parallel windings.

Second Embodiment

A stator of a rotating electric machine (not shown) in accordance with a second embodiment of the present invention is similar in basic configuration as in the first embodiment except that the winding specifications for the phase windings 41U, 41, V41 forming the stator winding 40 are different from those of the first embodiment. Therefore, only different features and important features will be described in the following description.

In the stator winding 40 of the second embodiment, as in the first embodiment, one end of a U-phase winding 41U that is a parallel connection of four parallel windings U1-U4, one end of a V-phase winding 41V that is a parallel connection of four parallel windings V1-V4, and one end of a W-phase winding 41W that is a parallel connection of four parallel windings W1-W4 are electrically star connected at a neutral point (see FIG. 6). The stator winding 40 is formed of a plurality of U-shaped conductor segments 50 inserted in a plurality of slots 31 from one axial end of the stator core 30 and connected in accordance with a given connection pattern as in the first embodiment.

Winding specifications for the stator winding 40 will now be explained with reference FIG. 13A, FIG. 13B, FIG. 14, and FIG. 15. However, for the sake of simplicity, since the specifications for the three phase windings 41U, 41V, 41W forming the stator winding 40 are similar except in electrical phase, it is sufficient to describe only the winding specification for the U-phase winding 41U.

Figure 14:
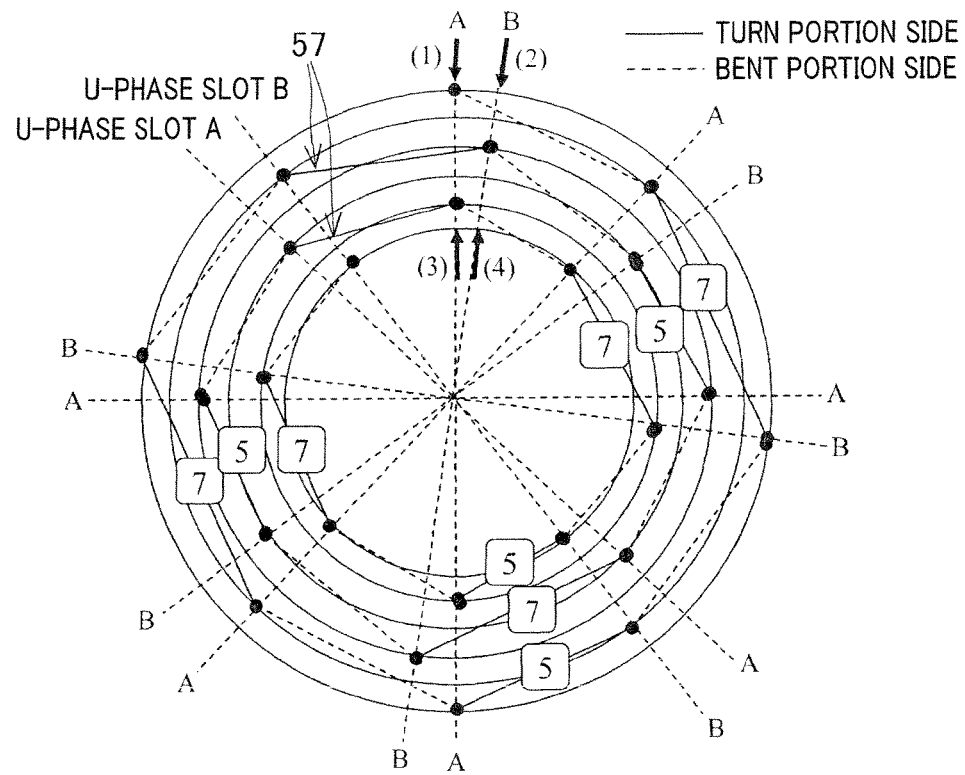
FIG. 14 is a schematic showing positions and a trajectory of slot-received portions of one of parallel windings (U3) of the stator winding of the second embodiment.

Referring to FIG. 14, pairs of circumferentially adjacent U-phase slots A, B (hereinafter also referred to as first and second U-phase slots) are disposed at six slot intervals. The upper pair of circumferentially adjacent U-phase slots A, B shown in FIG. 14 respectively correspond to the second slot (UA) and the third slot (UB) shown in FIG. 13A. Each of the first and second U-phase slots A, B receives an even number of slot-received (straight) portions of the U-phase winding 41U radially aligned in a column (see FIG. 5). The solid lines A-A each connecting two first U-phase slots A, A, the solid lines A-B each connecting two U-phase slots (one first U-phase slot and one second U-phase slot) A, B, and the solid lines each connecting two second U-phase slots B, B represent the turn-portion side of the conductor segments. The dashed lines A-A each connecting two first U-phase slots A, A, the dashed lines A-B each connecting two U-phase slots (one first U-phase slot and one second U-phase slot) A, B, and the dashed lines each connecting two second U-phase slots B, B represent the bent-portion-side (welding-side) portions of the conductor segments.

In FIG. 14, the parallel winding U3 of the U-phase winding 41U is shown originating from the sixth layer (the outermost layer) of the second slot (UA) and revolving inwardly from the position (1) of the sixth layer of the second slot (UA) in the clockwise direction through the fifth layer of the eighth slot (UA), the sixth layer of the fifteenth slot (UB), the fifth layer of the twenty-first slot (UB), the sixth layer of the twenty-sixth slot (UA), the fifth layer of the thirty-second slot (UA), the sixth layer of the thirty-ninth slot (UB), the fifth layer of the forty-fifth slot (UB) in this order, thereby providing the first revolution.

Figure 15:
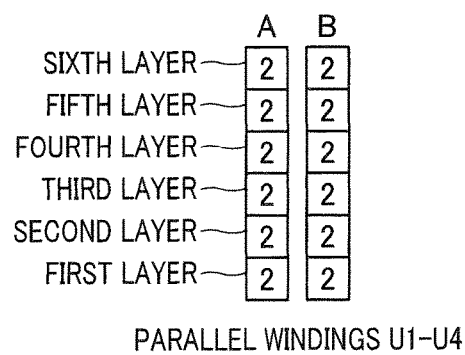
FIG. 15 is a schematic showing a number of phase windings received in each layer of each of a pair of circumferentially adjacent X-phase slots (X=U, V, W) of the second embodiment.

When going from the fifth layer of the eighth slot (UA) to the sixth layer of the fifteenth slot (UB) that is circumferentially seven slots away from the eighth slot (UA), and when going from the fifth layer of the thirty-second slot (UA) to the sixth layer of the thirty-ninth slot (UB) that is circumferentially seven slots away from the thirty-second slot (UA), the parallel winding U3 switches from one of the first U-phase slots A to one of the second U-phase slots B that is circumferentially seven slots away from the one of the first U-phase slots A (via seven slot pitch based switching). In addition, when going from the fifth layer of the twenty-first slot (UB) to the sixth layer of the twenty-sixth slot (UA) that is circumferentially five slots away from the twenty-first slot (UB), the parallel winding U3 switches from one of the second U-phase slots B to one of the first U-phase slots A that is circumferentially five slots away from the one of the second U-phase slots B (via five slot pitch based switching). That is, in the first revolution of the parallel winding U3, a combination of five and seven slot pitch based switchings allows the parallel winding U3 to circumferentially revolve while alternating the first and second U-phase slots A, B in the circumferentially direction. This allows, as shown in FIG. 15, the sixth and fifth layers of each of the first and second U-phase slots A, B to evenly receive two slot-received portions of the parallel winding U3.

Subsequently, the parallel winding U3 transitions from the fifth layer of the forty-fifth slot (UB) to the fourth layer of the third slot (UB) that is circumferentially six slots away from the forty-fifth slot (UB) via a transition line 57 to begin the second revolution. The transition line 57 provides transition between the E-th layer and the (E+1)-th layer (E being a positive even number). In the present embodiment, for E=2, the transition line 57 provides transition between the second layer (the fifth layer), from the winding starting side (the outer circumference side), and the third (the fourth layer) layer.

In the second revolution, as shown in FIG. 14, the parallel winding U3 of the U-phase winding 41U further revolves inwardly in the clockwise direction through the third layer of the ninth slot (UB), the fourth layer of the fourteenth slot (UA), the third layer of the twentieth slot (UA), the fourth layer of the twenty seventh slot (UB), the third layer of the thirty-third slot (UB), the fourth layer of the thirty-eighth slot (UA), the third layer of the forty-forth slot (UA) in this order.

When going from the third layer of the ninth slot (UB) to the fourth layer of the fourteenth slot (UA) and when going from the third layer of the thirty-third slot (UB) to the fourth layer of the thirty-eighth slot (UA), the parallel winding U3 switches from one of the second U-phase slots B to one of the first U-phase slots A that is circumferentially five slots away from the one of the second U-phase slots B (via five slot pitch based switching). In addition, when going from the third layer of the twentieth slot (UA) to the fourth layer of the twenty seventh slot (UB), the parallel winding U3 switches from one of the first U-phase slots A to one of the second U-phase slots B that is circumferentially seven slots away from the one of the first U-phase slots A (via seven slot pitch based switching). Also in the second revolution of the parallel winding U3, a combination of five and seven slot pitch based switchings allows the parallel winding U3 to circumferentially revolve while alternating the first and second U-phase slots A, B in the circumferential direction. This allows, as shown in FIG. 15, the fourth and third layers of each of the first and second U-phase slots A, B to evenly receive two slot-received portions of the parallel winding U3.

Subsequently, the parallel winding U3 transitions from the third layer of the forty-fourth slot (UA) to the second layer of the second slot (UB) that is circumferentially six slots away from the forty-fourth slot (UA) via the transition line 57 to begin the third revolution. The transition line 57 provides transition between the E-th layer and the (E+1)-th layer (E being a positive even number). In the present embodiment, for E=4, the transition line 57 provides transition between the fourth layer (the third layer), from the winding starting side (the outer circumference side), and the fifth (the second layer) layer.

In the third revolution, as shown in FIG. 14, the parallel winding U3 of the U-phase winding 41U further revolves inwardly in the clockwise direction through the first layer (the innermost layer) of the eighth slot (UA), the second layer of the fourteenth slot (UB), the first layer of the twenty-first slot (UB), the second layer the twenty-sixth slot (UA), the first layer of the thirty-second slot (UA), the second layer of the thirty-ninth slot (UB), the first layer of the forty-fifth slot (UB) at which the parallel winding U3 of the U-phase winding 41U terminates, in this order.

When going from the first layer of the eighth slot (UA) to the second layer of the fifteenth slot (UB) and when going from the first layer of the thirty-second slot (UA) to the second layer of the thirty-ninth slot (UB), the parallel winding U3 switches from one of the first U-phase slots A to one of the second U-phase slots B that is circumferentially seven slots away from the one of the first U-phase slots A (via seven slot pitch based switching). In addition, when going from the first layer of the twenty-first slot (UB) to the second layer of the twenty-sixth slot (UB), the parallel winding U3 switches from one of the second U-phase slots B to one of the first U-phase slots A that is circumferentially five slots away from the one of the one of the second U-phase slots B (via five slot pitch based switching). Also in the third revolution of the parallel winding U3, a combination of five and seven slot pitch based switchings allows the parallel winding U3 to circumferentially revolve while alternating the first and second U-phase slots A, B in the circumferential direction. This allows, as shown in FIG. 15, the first and second layers of each of the first and second U-phase slots A, B to evenly receive two slot-received portions of the parallel winding U3.

All of the transition lines 57 for the parallel winding U3 have a six slot pitch and located within a given circumferential section (between the forty-fourth slot and the third slot for instance) of the first coil end portion 41 of the stator winding 40. In addition, a winding starting end (the second slot) and a winding terminating end (the forty-fifth slot) are located within the given circumferential section for the transition lines 57.

The parallel winding U4 of the U-phase winding 41U originates from the sixth layer (the outermost layer) of the third slot (UB) and revolves inwardly from the position (2) of the sixth layer of the third slot (UB) as shown in FIG. 14 in the clockwise direction until the first to third revolutions are completed. During the first to third revolutions of the parallel winding U4, the five and seven slot pitch based switchings as above are alternated in a similar manner as set forth above regarding the parallel winding U3. That is, a combination of five and seven slot pitch based switchings allows the parallel winding U4 to revolve circumferentially while alternating the first and second U-phase slots A, B in the circumferential direction during the first to third revolutions of the parallel winding U4. This allows, as shown in FIG. 15, the first to sixth layers of each of the first and second U-phase slots A, B to evenly receive two slot-received portions of the parallel winding U4.

The parallel winding U1 of the U-phase winding 41U originates from the first layer (the innermost layer) of the second slot (UA) and revolves outwardly from the position (3) of the first layer of the second slot (UA) as shown in FIG. 14 in the counterclockwise direction until the first to third revolutions are completed. During the first to third revolutions of the parallel winding U1, the five and seven slot pitch based switchings as above are alternated in a similar manner as set forth above regarding the parallel winding U3. That is, a combination of five and seven slot pitch based switchings allows the parallel winding U1 to revolve circumferentially while alternating the first and second U-phase slots A, B in the circumferential direction during the first to third revolutions of the parallel winding U1. This allows, as shown in FIG. 15, the first to sixth layers of each of the first and second U-phase slots A, B to evenly receive two slot-received portions of the parallel winding U1.

The parallel winding U2 of the U-phase winding 41U originates from the first layer (the Innermost layer) of the third slot (UB) and revolves outwardly from the position (4) of the first layer of the third slot (UB) as shown in FIG. 14 in the counterclockwise direction until the first to third revolutions are completed. During the first to third revolutions of the parallel winding U2, the five and seven slot pitch based switchings as above are alternated in a similar manner as set forth above regarding the parallel winding U3. That is, a combination of five and seven slot pitch based switchings allows the parallel winding U2 to revolve circumferentially while alternating the first and second U-phase slots A, B in the circumferential direction during the first to third revolutions of the parallel winding U2. This allows, as shown in FIG. 15, the first to sixth layers of each of the first and second U-phase slots A, B to evenly receive two slot-received portions of the parallel winding U2.

This allows, for each of the parallel windings U1-U4, the first to sixth layers of each of the first and second U-phase slots A, B to evenly receive two slot-received portions of the parallel winding.

In the switching sections for the parallel windings U1-U4, V1-V4, and W1-W4, the parallel winding that switches between two slots A, B that are seventh adjacent to each other straddles the parallel winding that switches between two slots A, B that are fifth adjacent to each other, as shown in FIG. 9B. That is, there are no parallel winding that further straddles the parallel winding that switches between two slots A, B that are seven away from each other, which can prevent an Increase in the axial length of the first coil end portion.

The stator of the second embodiment configured as above can provide similar advantages as in the first embodiment. For example, the stator of the second embodiment can completely prevent circulating current from occurring between the parallel windings U1-U4, V1-V4, and W1-W4 while preventing an increase in the axial lengths of the first and second coil end portions, where the parallel windings U1-U4 form the U-phase winding 41U, the parallel windings V1-V4 form the V-phase winding 41V, and the parallel windings W1-W4 form the W-phase winding 41W.

Particularly, in the second embodiment, a combination of the five and seven slot pitch based switchings on the first coil end portion 41 side of the stator winding 40 allows each of the parallel windings X1-X4 to revolve circumferentially while alternating the first and second X-phase slots A, B (X=U, V, W) in the circumferential direction for each layer of the slots 31 during the first and third revolutions. This allows the circumferential distribution of slots 31 through which each of the parallel windings U1-U4, V1-V4, and W1-W4 passes in circumferential direction to be unbiased. In addition, this can reduce the Imbalance between the parallel windings U1-U4, V1-V4, and W1-W4 due to rotor eccentricity, and thus completely prevent circulating current from occurring.

Figure 16:
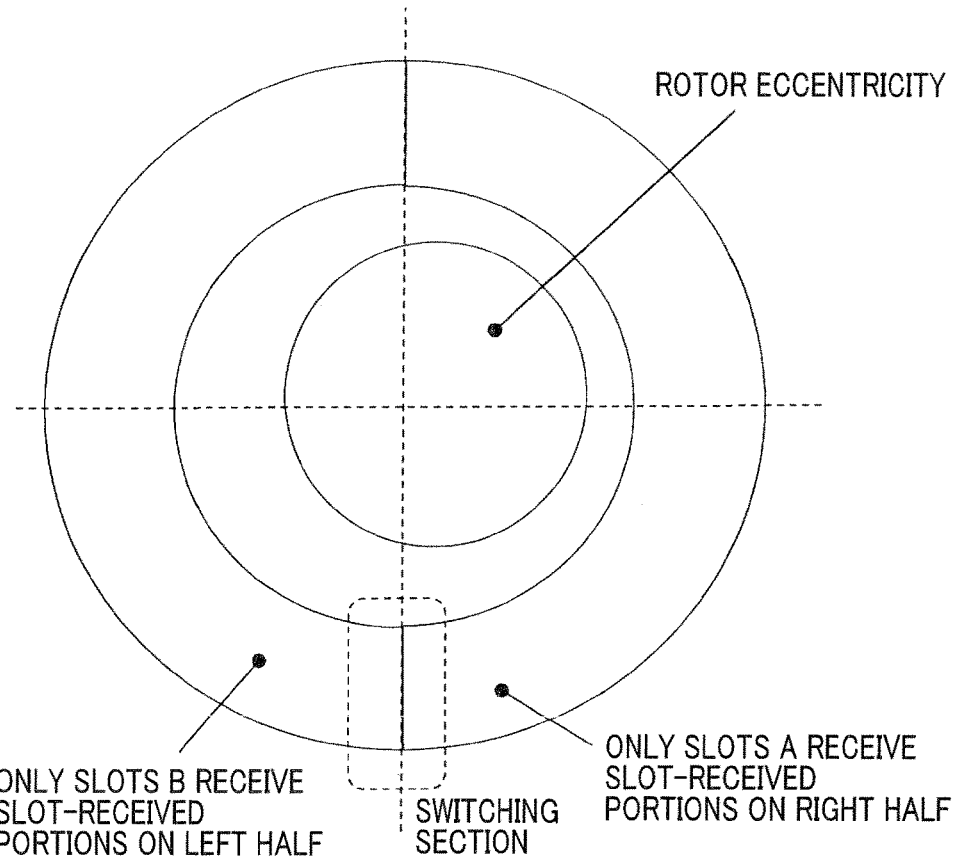
FIG. 16 is a schematic showing the eccentricity of a rotor of the rotating electric machine of the first embodiment.
Figure 17:
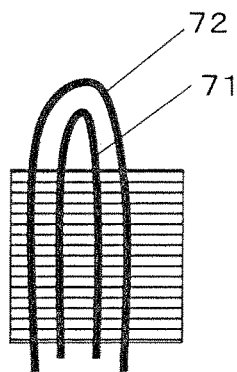
FIG. 17 is a schematic showing a comparative example.
Figure 18:
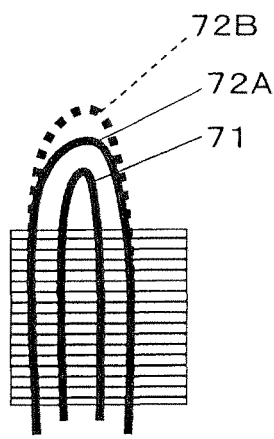
FIG. 18 is a schematic showing a comparative example.
Figure 19:
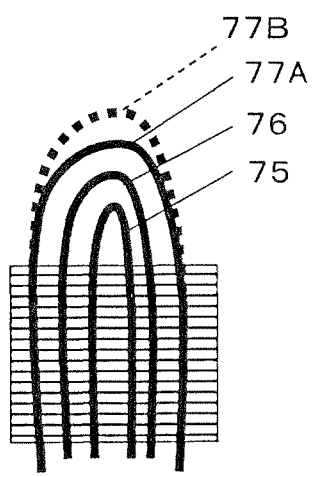
FIG. 19 is a schematic showing a comparative example.

It should be noted that, in the first embodiment, as shown in FIG. 16, the single switching section is present along the circumferential direction. On the right half of the stator core 30 relative to the single switching section, only the first X-phase slots A receive the slot-received portions of the parallel windings X1-X4 (X=U, V, W). On the left half of the stator core 30 relative to the single switching section, only the second X-phase slots B receive the slot-received portions of the parallel windings X1-X4 (X=U, V, W). That is, in the first embodiment, the circumferential distribution of slots 31 through which each of the parallel windings U1-U4, V1-V4, and W1-W4 passes in circumferential direction is biased. In the presence of such biased circumferential distribution of slots 31, the eccentricity of the rotor 14 may lead to imbalance between the parallel windings U1-U4, V1-V4, and W1-W4.

More advantageously, in the second embodiment, a combination of the five and seven slot pitch based switchings on the first coil end portion 41 side of the stator winding 40 allows each of the parallel windings X1-X4 to revolve circumferentially while alternating the first and second X-phase slots A, B (X=U, V, W) in the circumferential direction, which can prevent imbalance between the parallel windings U1-U4, V1-V4, and W1-W4 caused by the eccentricity of the rotor 14, and effectively prevent circulating current from occurring.

OTHER EMBODIMENTS

The foregoing disclosure and description of the invention is illustrative and explanatory thereof. Various changes in the details of the illustrated construction can be made within the scope of the appended claims without departing from the true spirit of the Invention.

In the first and second embodiments, the stator winding 40 having three-turn characteristics is implemented by setting a number of slot-received portions of the phase winding 41X (X=U, V, W) that can be inserted in each of the slots 31 (a parameter Q) to six and setting a number of parallel windings forming the phase winding 41X (X=U, V, W) (a parameter P) to four multiplied by n (four for n=1). As shown in table 1, a stator winding having characteristics for a desired number of turns can be implemented by changing the parameters Q, P. When a combination of the parameters (P, Q) is one of (4-6), (4-10), (8-6), (8-10), and (8-12), the stator winding having characteristics for an odd number or a decimal point number of turns can be implemented.

TABLE 1

| number of windings in each slot | number of parallel windings in each parallel connection | number of turns |
|---|---|---|
| 6 | 1 | 12 |
|   | 2 | 6 |
|   | 4 | 3 |
|   | 8 | 1.5 |
| 8 | 1 | 16 |
|   | 2 | 8 |
|   | 4 | 4 |
|   | 8 | 2 |
| 10 | 1 | 20 |
|   | 2 | 10 |
|   | 4 | 5 |
|   | 8 | 2.5 |
| 12 | 1 | 24 |
|   | 2 | 12 |
|   | 4 | 6 |
|   | 8 | 3 |

In the first and second embodiments, a sequence of one pair of adjacent U-phase slots into which the U-phase winding 41U is inserted, one pair of adjacent V-phase slots into which the V-phase winding 41V is inserted, and one pair of adjacent W-slots into which the W-phase winding 41W is inserted appear repeatedly along the circumferential direction of the stator core 30. Alternatively, for each layer of the slots 31, a sequence of one pair of adjacent U-phase slots into which the U-phase winding 41U is inserted, one pair of adjacent V-phase slots into which the V-phase winding 41V is inserted, and one pair of adjacent W-slots into which the W-phase winding 41W is inserted appear repeatedly along the circumferential direction of the stator core 30.

In the first and second embodiments, the stator of the rotating electric machine of the present invention was shown as being applied to the vehicle electrical motor. Alternatively, the stator of the rotating electric machine of the present invention may be applied to, as the rotating electric machine, either an alternator or an electrical motor mounted in a vehicle, or a rotating electric machine adapted to be selectively used as the generator or the electrical motor.

What is claimed is:

1. A stator for a rotating electric machine, the stator comprising:
a stator core having a plurality of slots circumferentially arranged around the core; and
a stator winding including three (U-phase, V-phase, W-phase) out-of-phase phase windings wound around the stator core, each of the phase windings being a parallel connection of 4×n (n being a positive integer) parallel windings, the stator winding being formed of a plurality of U-shaped conductor segments inserted in the slots from one axial end of the stator core, a pair of open end portions of each conductor segment extending axially outside of the stator core on the other axial end being bent toward circumferentially opposite directions, ends of given bent portions of the conductor segments are welded to each other such that the phase windings are electrically star connected to each other in a predetermined electrical connection pattern, wherein the plurality of slots comprise, for each of the phase windings, pairs of circumferentially adjacent slots, in each slot of which an even number of slot-received portions of the phase winding are radially aligned in a column, and for each pair of the circumferentially adjacent slots for the phase winding, the slot-received portion inserted in an m-th layer (m being a positive integer) of each slot of the pair of circumferentially adjacent slots being electrically connected to the slot-received portion inserted in an (m+1)-th layer of one of slots of an adjacent pair of circumferentially adjacent slots, each pair of circumferentially adjacent slots includes a first slot and a second slot, the second slot being circumferentially adjacent in a clockwise direction as view from a turn portion side of the stator winding, a first slot group comprises the first slots of the respective pairs of circumferentially adjacent slots, a second slot group comprises the second slots of the respective pairs of circumferentially adjacent slots, in a portion of the stator winding at an axial coil end of the stator winding opposite a portion of the stator winding formed of a plurality of bent portions, each of the parallel windings of each of the phase windings revolves circumferentially while alternating the first and second slot groups in the circumferential direction through a combination of five and seven slot pitch based switchings.

2. The stator of claim 1, wherein each of the conductor segments comprises a pair of parallel straight portions, and a turn portion connecting the pair of straight portions, and in a portion of the stator winding formed of a plurality of turn portions of the conductor segments at one axial coil end of the stator winding, the turn portion of each of the conductor segments axially straddles up to one of the turn portions of the other conductor segments.

3. The stator of claim 1, wherein each of the parallel windings comprises transition lines having a six slot pitch and providing transition between an E-th layer, from a winding starting end, of one slot and an (E+1)-th layer (E being a positive even number) of another slot that is six slots away from the one slot, all the transition lines being located within a given circumferential section of a portion of the stator winding formed of a plurality of turn portions of the conductor segments at one axial coil end of the stator winding, and a winding starting end and a winding terminating end of each of the parallel windings are within the given circumferential section.

4. The stator of claim 2, wherein each of the parallel windings comprises transition lines having a six slot pitch and providing transition between an E-th layer, from a winding starting end, of one slot and an (E+1)-th layer (E being a positive even number) of another slot that is six slots away from the one slot, all the transition lines being located within a given circumferential section of a portion of the stator winding formed of a plurality of turn portions of the conductor segments at one axial coil end of the stator winding, and a winding starting end and a winding terminating end of each of the parallel windings are within the given circumferential section.

\* \* \* \* \*